US007698588B2

(12) United States Patent
Boerstler et al.

(10) Patent No.: US 7,698,588 B2
(45) Date of Patent: Apr. 13, 2010

(54) CIRCUIT AND RELATED METHOD FOR SYNCHRONIZING DATA SIGNALS TO A CORE CLOCK

(75) Inventors: David William Boerstler, Round Rock, TX (US); Chulwoo Kim, Austin, TX (US); Stephen Douglas Weitzel, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1535 days.

(21) Appl. No.: 10/439,039

(22) Filed: May 15, 2003

(65) Prior Publication Data
US 2005/0018799 A1 Jan. 27, 2005

(51) Int. Cl.
G06F 1/12 (2006.01)
G06F 1/04 (2006.01)
H04L 7/10 (2006.01)

(52) U.S. Cl. .................... 713/400; 713/500; 713/501; 713/502; 713/503; 375/355

(58) Field of Classification Search ......... 713/500–503, 713/400; 375/360, 355
See application file for complete search history.

(56) References Cited

U.S. PATENT DOCUMENTS

| 4,503,400 A * | 3/1985 | Edwards et al. ............. 331/1 A |
| 6,714,612 B1 * | 3/2004 | Chaudry ..................... 375/368 |
| 7,120,216 B2 * | 10/2006 | Shirota et al. ............... 375/373 |
| 7,269,754 B2 * | 9/2007 | Ramaswamy et al. ........ 713/401 |
| 2001/0033188 A1 * | 10/2001 | Aung et al. .................. 327/141 |
| 2002/0087909 A1 * | 7/2002 | Hummel et al. ............. 713/400 |
| 2003/0081713 A1 * | 5/2003 | Pontius et al. ............... 375/372 |
| 2003/0105985 A1 * | 6/2003 | Keller et al. ................. 713/400 |
| 2003/0163627 A1 * | 8/2003 | Deng et al. .................. 710/305 |
| 2004/0104749 A1 * | 6/2004 | Yeh ............................. 327/141 |

* cited by examiner

*Primary Examiner*—Thomas Lee
*Assistant Examiner*—Fahmida Rahman
(74) *Attorney, Agent, or Firm*—Jill Poimboeuf; The Brevetto Law Group; Scott Charles Richardson

(57) ABSTRACT

The present invention discloses, in one aspect, a synchronizing circuit for synchronizing transmitted data. In one embodiment, the synchronization technique comprises a subsystem configured to compare positive and negative transitions of a core clock signal with positive and negative transitions of a source clock signal to determine a relationship between the transitions of the core clock signal and positions of the negative transitions of the source clock signal. The synchronization circuit also comprises logic circuitry coupled to the subsystem and configured to generate a final sampling signal based on the relationship. In addition, the synchronization circuit comprises a data sampler coupled to the logic circuitry and configured to sample a source data signal synchronized with the source clock signal using the final sampling signal, and to generate a core data signal synchronized with the core clock signal based on the sampling. Also disclosed is a method of synchronizing a data stream, and a data transfer assembly incorporating the synchronization circuit and the method.

19 Claims, 5 Drawing Sheets

CIRCUIT AND RELATED METHOD FOR SYNCHRONIZING DATA SIGNALS TO A CORE CLOCK

FIELD OF THE INVENTION

The present invention generally relates to synchronizing data and, more particularly, to a synchronizing circuit and related method for synchronizing data transferred from one domain to another.

BACKGROUND OF THE INVENTION

Since the introduction of the digital age, the execution of processing functions within a computer system typically requires the transmission of data from one domain to another. Each domain, the source clock domain where the data originates and the core clock domain to which the data is transmitted, has its own local clock on which the timing of the various components in each domain is based. To transmit the data, the original data stream, which is synchronized to a local source clock in the source clock domain, is sent to buffers or similar components in the core clock domain. However, due to manufacturing specification differences and the like, the frequencies of these local clocks typically differ. With differing frequencies, the reconstructed data stream in the core clock domain is not synchronized with the components in the core clock domain and, thus, cannot easily be used with those components. As a result, attempts for synchronizing the data once it arrives in the core clock domain have continued to develop.

One technique for synchronizing the regenerated data is to extract the clock from the incoming data stream itself. This approach typically employs a phase-locked loop (PLL) or similar circuit for this purpose. However, the longer the distance between the two domains, for example, in chip-to-chip transfers, the more pulse edge distortion typically appears on the data signal when received. As a result, it becomes increasingly difficult to extract good timing information from the data signal. To make matters worse, such distortion usually increases even further over longer periods of time and, thus, the valid period of each data byte becomes smaller and smaller. Those who are skilled in this field of art understand this to be "closing of the eye," which requires the sampling interval to become more and more precise as this distortion increases to avoid an increase in bit error rate (BER) in the reconstructed data. Furthermore, PLL circuits usually occupy a lot of valuable chip real estate and are sensitive to noise and often trying to couple to other PLL circuits located nearby. Moreover, many or all of these difficulties are typically found whether the data is transferred serially from the source clock domain to the core clock domain, or whether the data is deserialized for parallel transmission from one to the other.

Another approach would be to ensure that the frequency of the core clock in the core clock domain matches that of the source clock where the data originates. Unfortunately, this approach is not practical since various manufactures and differing standards are typically employed when manufacturing the various processing chips typically involved in this type of data transfer. For example, a chip having a central processor for a computer system may be manufactured by one company and designed to operate using a local clock at a given frequency. Then, a memory chip, in which data employed by the processing chip is stored and retrieved, may be manufactured by a different company and designed to operate at a completely different local clock frequency. Thus, to ensure matching local clock frequencies, separate chips operating at the same frequency would have to be selected or specially constructed, typically increasing overall manufacturing difficulty and costs associated with the finished products.

A related approach has been to transfer a deserialized source clock in parallel, along with the deserialized data streams, on its own interconnect between the two domains. Thus, with this approach, the actual local source clock is sent to the core clock domain. However, without almost perfectly matched, low loss circuits at the receiving end, distortion, and thus BER in the reconstructed data, typically impedes good data recovery. In addition, if different frequencies are present in the two domains, the transferred data must still be synchronized with the local clock in the core clock domain if it is to be used with local components operating at the core clock frequency. As a result, some or all of the problems discussed above may still become prevalent.

Accordingly, what is needed in the art is a synchronization circuit, providing a synchronization technique, for synchronizing data transferred from one domain having a given local clock frequency to another domain having a different local clock frequency, that does not suffer from the typical deficiencies associated with conventional synchronizing techniques.

SUMMARY OF THE INVENTION

To address the above-discussed deficiencies of the prior art, the present invention provides, in one aspect, a synchronizing circuit for synchronizing data. In one embodiment, the synchronization circuit comprises a subsystem configured to compare positive and negative transitions of a core clock signal with positive and negative transitions of a source clock signal to determine a relationship between the transitions of the core clock signal and positions of the negative transitions of the source clock signal. The synchronization circuit also comprises logic circuitry coupled to the subsystem and configured to generate a final sampling signal based on the relationship. In addition, the synchronization circuit comprises a data sampler coupled to the logic circuitry and configured to sample a source data signal synchronized with the source clock signal using the final sampling signal and to generate a core data signal synchronized with the core clock signal based on the sampling.

BRIEF DESCRIPTION OF THE DRAWINGS

The invention may be understood by reference to the following description taken in conjunction with the accompanying drawings, in which like reference numerals identify similar elements, and in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, certain details have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, a computer program product having a computer readable medium with a computer program embodied thereon, and/or integrated circuits that are coded to perform such functions, unless indicated otherwise.

Figure 1:
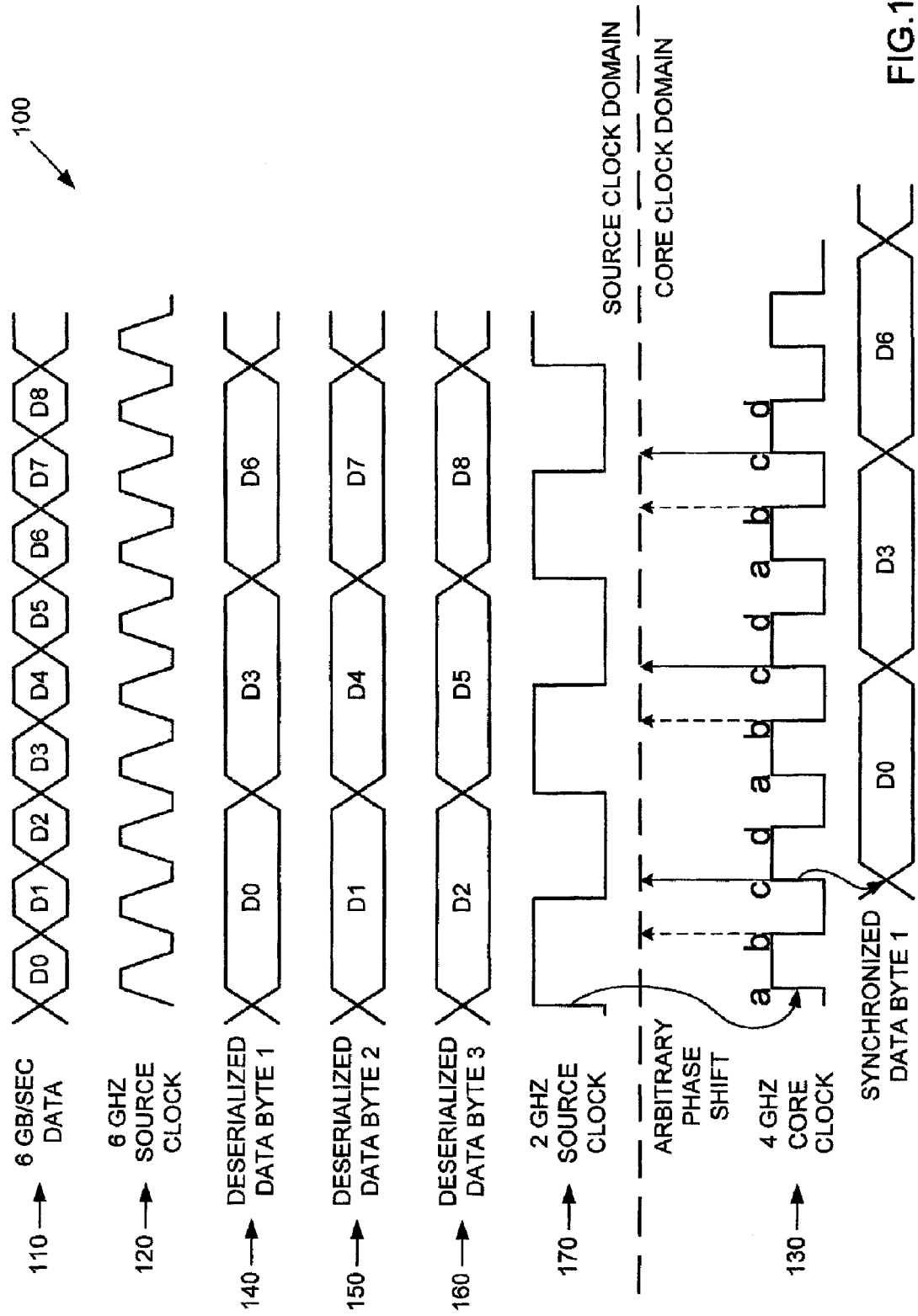
FIG. 1 illustrates a diagram of one embodiment of data stream sampling conducted using the synchronization technique according to the principles described herein.

Turning initially to FIG. 1, illustrated is a diagram 100 of one embodiment of data stream sampling conducted according to the principles described herein. The diagram 100 includes a source data stream 110, illustrated in FIG. 1 as a 6 Gb/sec data stream, in the source clock domain. For purposes of this disclosure, the source clock domain indicates a location having source data to be transferred to another location. The core clock domain shown in FIG. 1 is that destination location. In an exemplary embodiment, the source clock domain may be a first processing chip, while the core clock domain may be a second processing chip. Of course, the invention is not so limited, and the source and core clock domains may be embodied on the same chip.

The source clock domain includes a local clock with which the data stream 110 is synchronized. That local clock is the source clock 120, and is illustrated as a 6 GHz source clock, in synchronization with the 6 Gb/sec data stream 110. Components in the source clock domain operate with the same frequency as the source clock 120. Similarly, the core clock domain includes its own local clock signal, illustrated as the core clock 130 and having a frequency with which components located in the core clock domain operate. In this embodiment, the core clock 130 is a 4 GHz core clock, but other frequencies may also be employed. As is typically the case, the source clock 120 differs in timing from the core clock 130, causing data streams transferred from one to the other to be asynchronous with respect to the local clock of their destination domain. As such, the present invention provides a novel synchronization technique for synchronizing the source data stream 110 to the core clock 130 once transferred to the core clock domain.

As illustrated, the source data stream 110 includes first through ninth data bytes, enumerated as D0 through D8, respectively. These data bytes D0-D8 represent the information to be transferred from the source clock domain to the core clock domain. As those who are skilled in the pertinent field of art understand, to transfer the data stream 110, it is reconstructed in the core clock domain for use with core clock domain components, typically accomplished by sampling the source data stream 110 in the core clock domain in order to generate a core data stream as identical as possible to the source data stream 110. As discussed above, however, the regenerated data stream should be synchronized to the core clock 130 in the core clock domain before it may be used in that domain.

To accomplish the transfer, the source data stream 110 is first deserialized into multiple data streams. In the illustrated embodiment, the source data stream 110 is deserialized into first, second and third data streams 140, 150, 160. Each of the data streams 140, 150, 160 are deserialized equally, resulting in the three 2 Gb/sec data streams 140, 150, 160. Accordingly, each of the data streams 140, 150, 160 is synchronized with a deserialized 2 GHz source clock 170. Once deserialized, the first data stream 140 includes the first, fourth, seventh, etc., data bytes D0, D3, D6 . . . DN originally found in the source data stream 110. Similarly, the second data stream 150 includes the second, fifth, eighth, etc., data bytes D1, D4, D7 . . . DN+1, while the third data stream 160 includes the third, sixth, ninth, etc., data bytes D2, D5, D8 . . . DN+2 from the source data stream 110. By deserializing the data stream 110 from the original 6 GHz source clock 120 to the 2 GHz source clock 170, each of the data bytes D0-D8 now exist for approximately three source clock cycles, thus slowing the data streams 140, 150, 160 down for easier sampling in the core clock domain. The deserializing of the source data stream 110 may be accomplished using any known or later developed technique, and the deserialized data streams 140, 150, 160 are transferred to the core clock domain via parallel interconnects positioned between the source and core clock domains. In addition, the 2 GHz source clock 170 is also transferred to the core clock domain via an interconnect for use in regenerating the data stream 110 in the core clock domain.

By employing parallel interconnects, rather than a serial transmission, many of the problems associated with the transmission media may be avoided. For example, the capacitance, inductance, "skin effect", etc., that typically increases attenuation as the frequency goes up may be decreased or even avoided. Thus, slowing the data transmission itself, through the deserialization discussed above, also reduces the bit-error-rate (BER) of the data transfer by providing, in this example, three interconnect wires operating at one-third the rate. Moreover, less cost is typically required to manufacture parallel interconnects operating at a slower rate than a single serial interconnect operating at three times the speed.

As shown in FIG. 1, the 2 GHz source clock 170 has a 50% duty cycle, as is typically desirable in practical data transmission applications. As a result, the positive edges of the 2 GHz source clock 170 are in phase with the transitions of the deserialized data streams 140, 150, 160, while the negative edges of the 2 GHz source clock 170 are in phase with the centers of the data eye openings of the data bytes D0-D8.

As the deserialized data streams 140, 150, 160 are transferred to the core clock domain, as well as the deserialized 2 GHz source clock 170, the 2 GHz source clock 170 is sampled with the 4 GHz core clock 130. As illustrated, through the sampling, edge A of the 4 GHz core clock 130 results in a high signal in the 2 GHz source clock 170. A sampling with edge B of the 4 GHz core clock 130 also results in a high signal. A sampling with edge C of the 4 GHz core clock 130 results in a low signal, and a sampling with edge D also results in a low signal. Then, looking for the transitions in the 2 GHz source clock 170 with this sampling reveals that from edge B to edge C of the 4 GHz core clock 130, there is a transition from high to low in the 2 GHz source clock 170. Thus, the negative edge of the 2 GHz source clock 170 has occurred somewhere between edge B and edge C. Those skilled in the art understand that the negative edges of a source clock will typically align with the center of the data eye for each data stream 140, 150, 160, typically the optimum location for sampling and reconstructing data. As a result, with those two pieces of information, each data stream 140, 150, 160 may be sampled in the center of the data eye by using either sampling edge B or edge C of the 4 GHz core clock 130 to do the sampling. In the illustrated embodiment, edge C was employed.

In another embodiment, edge B may be employed, since the 2 GHz source clock 170 is found to go low somewhere between edge B and edge C. However, the invention permits either edge to be employed because the synchronization technique disclosed herein is adaptive. Stated another way, the circuitry employed to provide the present technique is constantly active, adapting to any changes or phase shifts in the 2 GHz source clock 170 being sampled. To this end, the present technique overcomes potential phase shifts between the 2 GHz source clock 170 and the 4 GHz core clock 130, as shown in FIG. 1.

Once the determination of which sampling edge to use has been made, the data streams 140, 150, 160 are instantly sampled each time a low transition is found in the sampling of the 2 GHz source clock 170. In a more specific embodiment, the data carried by the data streams 140, 150, 160 may already be in a buffer or similar component in the core clock domain, waiting to be sampled. Each time edge C is present, and thus a low transition is present in the 2 GHz source clock 170, the generating of the data byte may begin in the core clock domain. When the next edge C is reached, the data byte is complete. At this point, a next data byte will be generated in the same manner using the present synchronization technique. In addition, all three data streams 140, 150, 160 may be sampled and reconstructed in parallel since each is synchronized with the 2 GHz source clock 170. For example, the first set of reconstructed data, synchronized data byte 1, would include D0, D1 and D2, in parallel. The second set would then include D3, D4 and D5, and so on.

Figure 2:
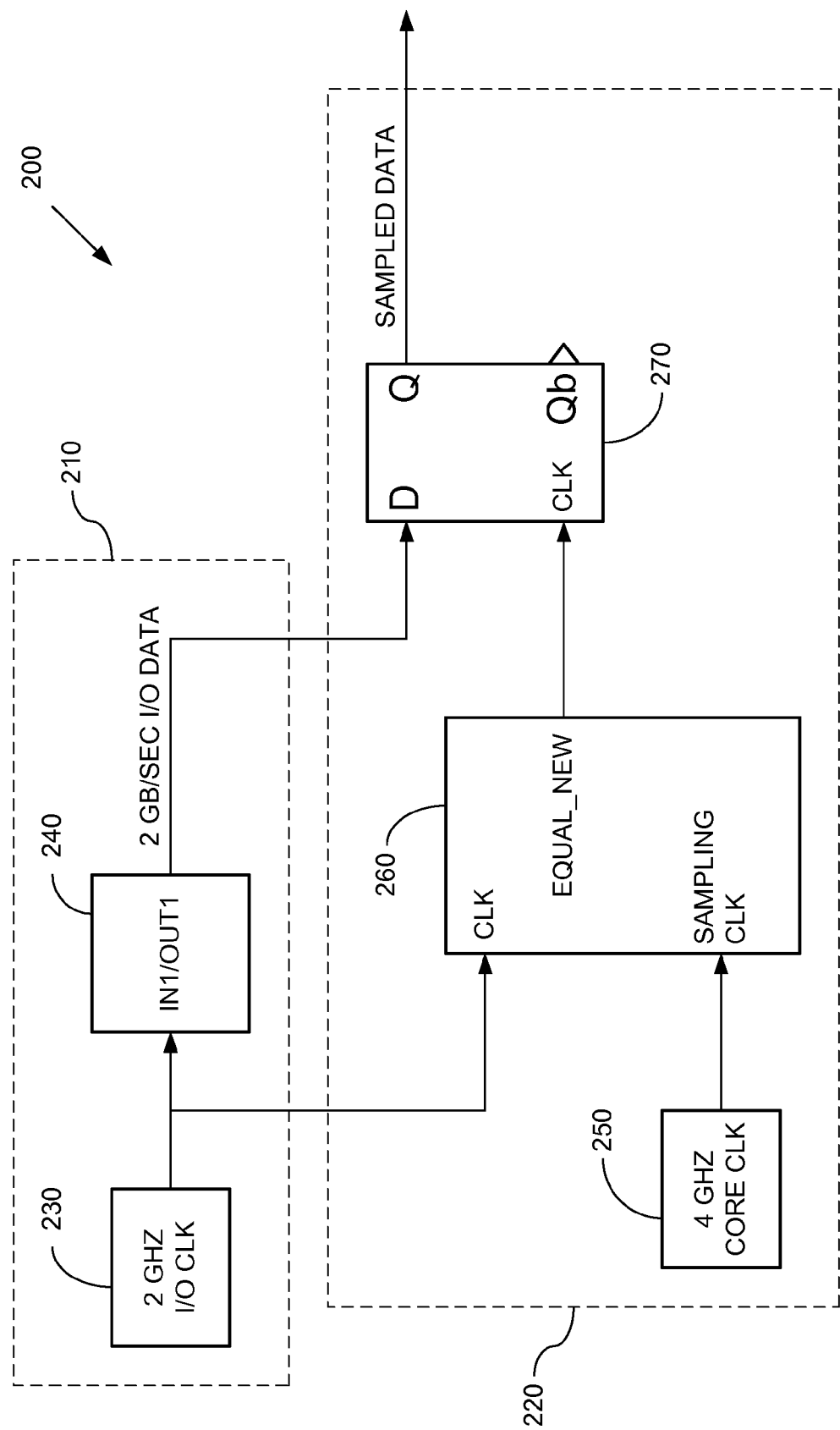
FIG. 2 illustrates a block diagram of one embodiment of a data transfer assembly configured to employ the disclosed synchronization technique to reconstruct data.

Turning now to FIG. 2, illustrated is one embodiment of a data transfer assembly 200 configured to employ the disclosed synchronization technique to reconstruct data. The data transfer assembly 200 includes a source clock domain 210 and a core clock domain 220. In accordance with the discussion above, data is transferred from the source clock domain 210 to the core clock domain 220 using the synchronization technique disclosed herein.

The source clock domain 210 includes a 2 GHz source clock 230. The 2 GHz source clock 230 is only one of a plurality of deserialized source clocks derived from a single original source clock (not illustrated), such as the 6 GHz source clock 120 shown in FIG. 1. The deserialized 2 GHz source clock 230 is fed into a data generator 240, also located in the source clock domain 210. The data generator 240 is configured to generate a deserialized data steam comprising only a portion of a single original data stream to be transferred to the core clock domain 220. The deserialized data steam coming from the data generator 240 is synchronized with the 2 GHz source clock 230. Additionally, a plurality of data generators 240 may be present in the source clock domain 210, each generating a deserialized data stream based on the plurality of deserialized data streams to be transferred to the core clock domain 220. Thus, although only one 2 GHz source clock 230 and one associated data stream is shown being transferred to the core clock domain 220, the synchronization technique is capable of handling multiple such data streams and associated interconnections between the two domains.

The core clock domain 220 includes a 4 GHz core clock 250 for providing a local timing signal for all the components found in the core clock domain 220. As discussed above, the core clock 250 has a different frequency than the source clock 230, or even the original source clock from which the clock 230 was derived. The core clock domain 220 also includes a synchronization circuit for synchronizing the reconstructed data streams with the core clock 250. The synchronization circuit includes a clock sampler 260 and a data sampler 270. The clock sampler 260 is comprised of logic circuitry configured to provide a final data sampling signal (equal_new) based on a comparison of the 2 GHz source clock 230 and the 4 GHz core clock 250. The components and circuitry that may be included in the clock sampler 260 are discussed in greater detail with reference to FIG. 3.

Once the clock sampler 260 generates the final sampling signal equal_new, that sampling signal is input to the data sampler 270. In addition, the deserialized data stream is also input to the data sampler 270. Thus, the data sampler 270 employs the final sampling signal equal_new to sample an incoming data stream in accordance with the sampling signal. As the data sampler 270 samples the data stream, a signal representing the reconstructed data is output from the data sampler 270 for use by other components in the core clock domain 220. Moreover, although containing the same data as the original deserialized data signal found in the source clock domain 210, the reconstructed data signal output from the data sampler 270 is now synchronized with the 4 GHz core clock 250, rather than the original source clock. In the illustrated embodiment, the data sampler 270 is comprised of a flip-flop, however, any other appropriate component or components may be employed as the data sampler 270 without varying from the scope of the present synchronization technique.

Furthermore, in embodiments where multiple deserialized data streams are transferred to the core clock domain 220, a data sampler 270 for each such data stream may be employed. However, in such embodiments, only one clock sampler 260 is necessary to employ the disclosed synchronization technique on the plurality of data streams. The reconstructed data signals output from the multiple data samplers 270 could then be recombined to arrive at a single serial data signal for use in the core clock domain 220. Alternatively, each generated data stream may simply be employed by components in the core clock domain 220 individually.

Figure 3:
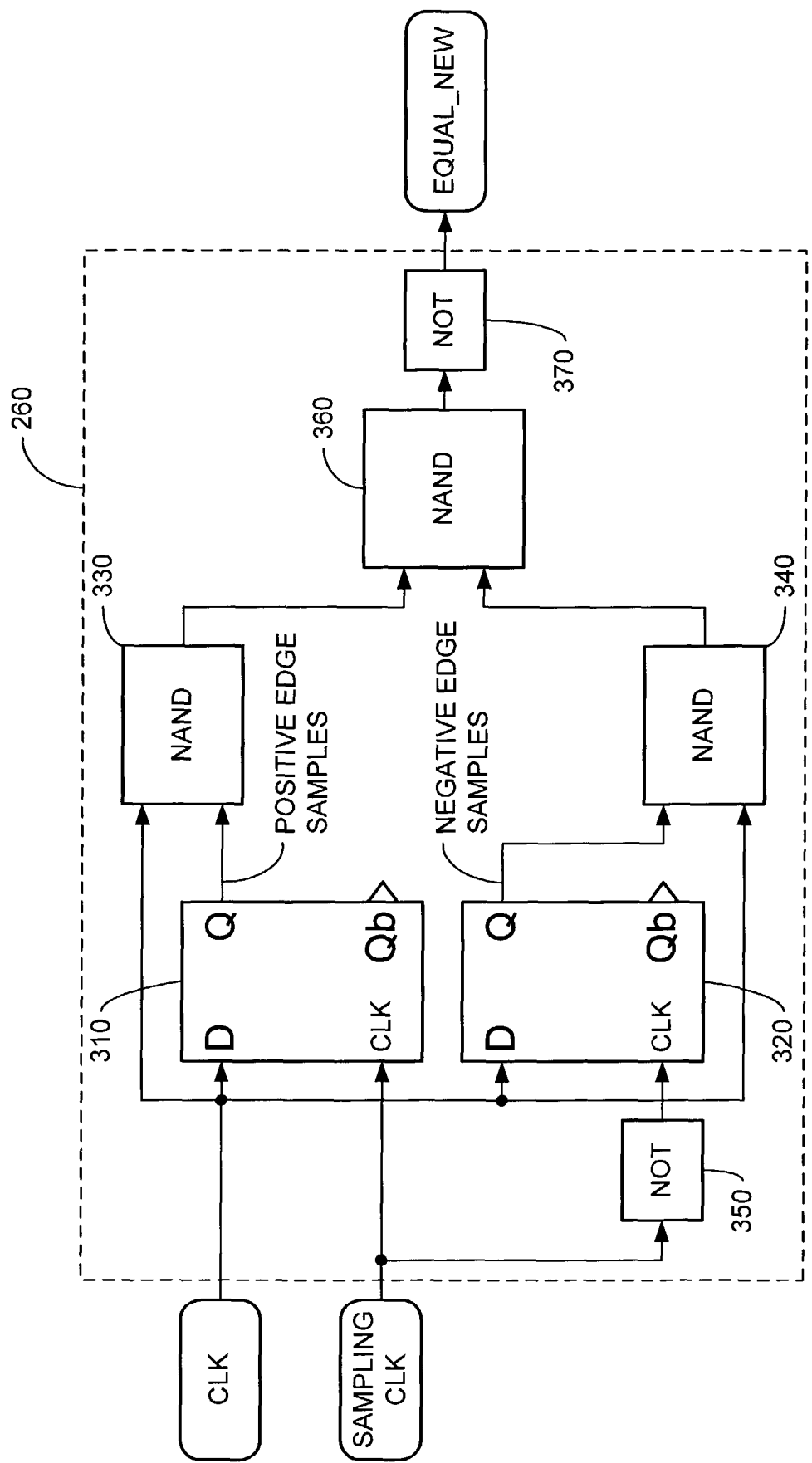
FIG. 3 illustrates a more detailed block diagram of one embodiment of the clock sampler discussed with respect to FIG. 2.

Looking now at FIG. 3, illustrated is a more detailed block diagram of one embodiment of the clock sampler 260 discussed with respect to FIG. 2. As mentioned in FIG. 2, the 2 GHz deserialized source clock 230 is input to the clock sampler 260 via a CLK input. In addition, the 4 GHz core clock 250 is input to the clock sampler 260 as a sampling CLK. Within the clock sampler 260, a subsystem is configured to compare positive and negative transitions of the 4 GHz core clock signal 250 with positive and negative transitions of the 2 GHz source clock signal 230 to determine a relationship between the transitions of the core clock 250 and positions of the negative transitions of the source clock 230. In the illustrated embodiment, the subsystem includes first and second flip-flops 310, 320. In addition, the subsystem includes first and second logic circuits 330, 340, respectively associated with the first and second flip-flops 310, 320. In the exemplary embodiment, the first and second logic circuits are first and second NAND gates 330, 340, but the synchronization circuit is not limited to any particular components.

As shown, the first flip-flop 310 and first NAND gate 330 provide a comparison using only positive edge samples of the clock signals. Likewise, the second flip-flop 320 and the second NAND gate 340 provide a comparison using only the negative edge samples of the clock signals. More specifically, the 2 GHz source clock 230 is input to the data inputs (D) on the first and second flip-flops 310, 320, so it may be used by the clock sampler 260 as a data signal rather than merely a clock signal. In addition, the source clock 230 is input to the first and second NAND gates 330, 340.

The 4 GHz core clock 250 is input into the flip-flops 310, 320 for use as the input clock signal (CLK). More specifically, for determining the positive edge samples of the core clock 250, the true core clock 250 is used by the first flip-flop 310 and compared to the source clock 230. However, for determining the negative edge samples of the core clock 250, the inverse (180 degree phase shift) of the core clock 250 is input to the second flip-flop 320. This phase shifted input is provided to the second flip-flop 320 via an inverter in the form of a NOT gate 350, but any type of inverter may be employed.

The sample results from the flip-flops 310, 320 are then compared with the source clock 230 by the NAND gates 330, 340. Specifically, the first NAND gate 330 compares only the positive edge samples with the source clock 230, while the second NAND gate 340 compares only the negative edge samples with the source clock 230. Looking at the positive transitions on the 4 GHz core clock 250, if the 2 GHz source clock 230 is high, then the positive edge sample is made high. However, if the source clock 230 is low, the positive edge sample is made low. The opposite is done with the negative transitions on the 4 GHz core clock 250, since they are phase shifted 180 degrees from the positive transitions. In this case, if the 2 GHz source clock 230 is low, then the negative edge sample is made high. However, if the source clock 230 is high, the negative edge sample is made low.

After the comparisons are made by the NAND gates 330, 340 and the negative transitions of the source clock 230 have been determined, the results are input into logic circuitry configured to generate the final sampling signal equal_new based on the relationship between the source clock 230 and the core clock 250 provided from the comparisons. In the illustrated embodiment, the logic circuitry is comprised of a third NAND gate 360 followed by a second NOT gate 370. The third NAND gate 360 followed by the second NOT gate 370 creates an AND logic function and provides the combination of the results from the first and second NAND gates 330, 340, thus establishing a relationship between the positive and negative edges of the core clock 250 with the locations of the negative transitions of the source clock 230 for use in creating the final sampling signal equal_new. As shown in FIG. 2, the final sampling signal equal_new is output from the clock sampler 260 and input to the data sampler 270, where the positive edges of the final sampling signal equal_new are used to generate the reconstructed data stream, now synchronized with the 4 GHz core clock 250.

Figure 4:
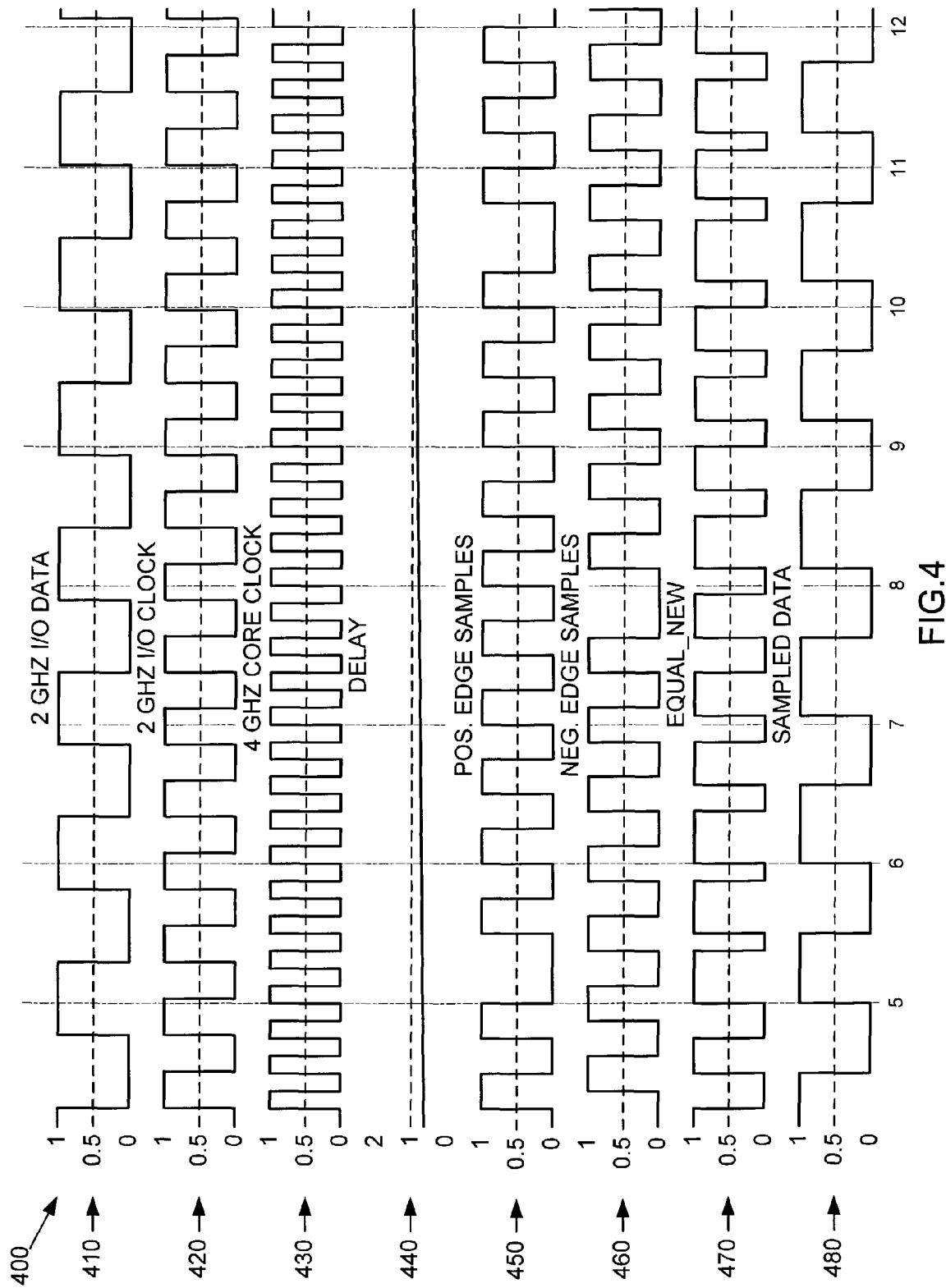
FIG. 4 illustrates a set of timing diagrams generated from an actual data transfer between two chips having different local clock frequencies.

Referring now to FIG. 4, illustrated is a set of timing diagrams 400 generated from an actual data transfer between two chips having different local clock frequencies. The diagrams 400 include a 2 Gb/sec deserialized data stream 410, as well as a 2 GHz deserialized source clock 420 to which the data stream 410 is synchronized. Also illustrated is a 4 GHz core clock 430, as well as a slight delay 440 introduced between the source and core clocks, which may typically be found in practical applications. However, this delay 440 may be overcome using the adaptive synchronization technique disclosed herein. Waveforms illustrating the positive edge samples 450 and the negative edge samples 460 taken from the core clock 430 are also shown.

As may be seen from the diagrams, the positive edge samples 450 and the negative edge samples 460, after an initialization over one time unit, are staggered. Following the positive transitions on the 4 GHz core clock 430, if the 2 GHz source clock 420 is high, then the positive edge sample 450 is high. Likewise, if the source clock 420 is low, the positive edge sample 450 is low. An opposite situation occurs with the negative edge samples 460. If the 2 GHz source clock 420 is low, then the negative edge sample 460 is high. Then, if the source clock 420 is high, the negative edge sample 460 is low.

Once the positive and negative edge samples 450, 460 have been derived based on the source clock 420, thus determining the negative transitions in the source clock 420, the two are combined to create the final sampling signal equal_new, the waveform of which is illustrated in FIG. 4 as 470. More specifically, as mentioned above, an AND operation is performed on the positive and negative edge samples 450, 460 using appropriate logic circuitry designed for the task. The final sampling signal 470 is then used to sample the original incoming data to reconstruct it in synchronization with the core clock 430 rather than the source clock 420.

The sampled data is shown in waveform 480, where it may be seen that the positive edges of the equal_new signal 470 are used to sample the incoming data stream. This may be seen from the fact that sampled data signal 480 transitions occur on the positive transitions of the equal_new signal 470. Furthermore, comparing the 2 Gb/sec source data signal 410 with the sampled data signal 480 produced by the data sampler, the two are aligned and shifted in phase. Moreover, the sampled data signal 480 is synchronized with the 4 GHz core clock signal 430, rather than the 2 GHz source clock signal 420. Still further, the same advantageous results were obtained over a large variation of delay, and over a larger number of cycles thanks to the adaptive nature of the synchronization technique provided by the constant sampling of the source clock 420 to detect its negative transitions.

Figure 5:
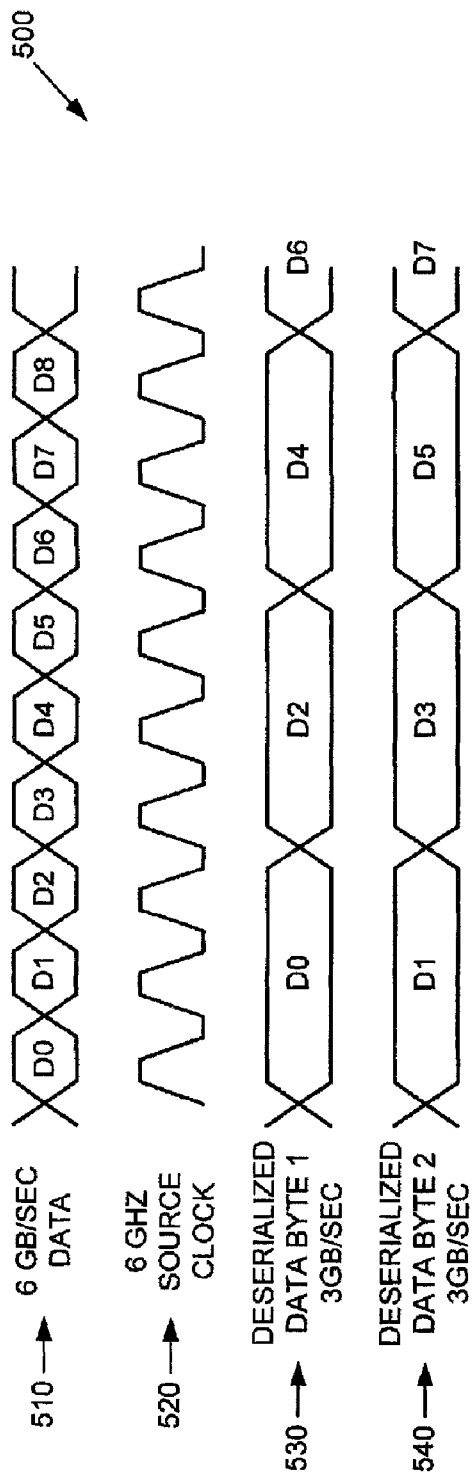
FIG. 5 illustrates a diagram of another embodiment of data stream sampling conducted according to the synchronization technique disclosed herein.
Figure 5:
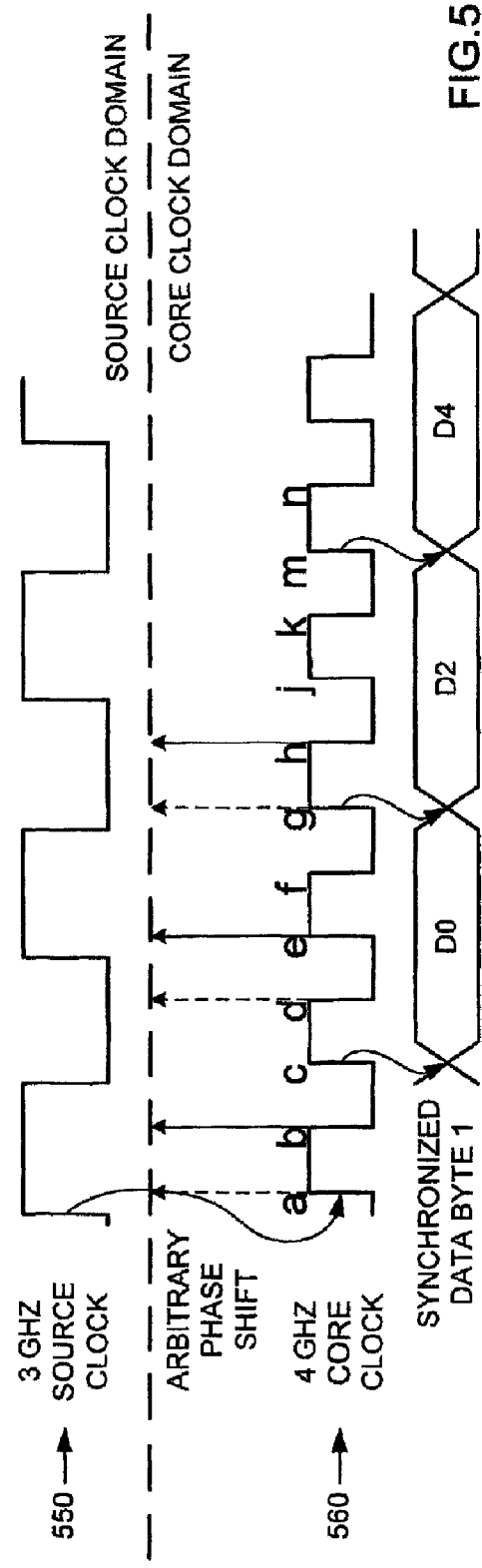

Turning finally to FIG. 5, illustrated is a diagram 500 of another embodiment of data stream sampling conducted according to the synchronization technique disclosed herein. Like FIG. 1, the diagram 500 includes a 6 Gb/sec data stream 510 within a source clock domain. The data stream 510 will be transferred to components in a core clock domain by reconstructing the data in the core clock domain. Also, as before, the data stream 510 is synchronized with a 6 GHz source clock 520, but needs to be synchronized to the local clock in the core clock domain once transferred.

Rather than deserializing the data stream 510 and source clock 520 into three parts, the embodiment in FIG. 5 illustrates the data stream 510 deserialized into only two 3 Gb/sec data streams 530, 540. As a result, the two deserialized data streams 530, 540 are synchronized with a deserialized 3 GHz source clock 550. Once deserialized, the first data stream 530 includes the first, third, fifth, seventh, etc., data bytes D0, D2, D4, D6 . . . DN originally found in the serial data stream 510. Similarly, the second data stream 540 includes the second, fourth, sixth, eighth, etc., data bytes D1, D3, D5, D7 . . . DN+1 from the serial data stream 510. By deserializing the data stream 510 into two streams, from the original 6 GHz source clock 520 to the 3 GHz source clock 550, each of the data bytes D0-D7 now exist for approximately two source clock cycles, thus slowing the data streams 530, 540 down for easier sampling in the core clock domain. With this layout, this embodiment would include only three interconnects to transfer the data streams 530, 540 and the deserialized clock 550 to the core clock domain.

As before, the deserialized source clock 550 has a 50% duty cycle, and the positive edges of the 3 GHz source clock 550 are in phase with the transitions of the deserialized data streams 530, 540, while the negative edges of the 3 GHz source clock 550 are in phase with the centers of the data eye openings of the data bytes D0-D7. Also, as with the embodiment in FIG. 1, as the deserialized data streams 530, 540 and the deserialized 3 GHz source clock 550 are transferred to the core clock domain, the 3 GHz source clock 550 is sampled with a 4 GHz core clock 560 in the core clock domain. As illustrated, through the sampling, edge A of the 4 GHz core clock 560 results in a high signal, while the sampling with edge B results in a low signal. Sampling with edge C also results in a low signal, while edge D is a high signal. Continuing the sampling, edge E results in a low signal, edge F results in a high signal, edge G results in a high signal, and edge H results in a low signal. Through the sampling in this embodiment, the negative transitions of the 3 GHz source clock 550 appear from edge A to edge B, from edge D to edge E, and from edge G to edge H.

As mentioned above, the negative transitions of the deserialized 3 GHz source clock 550 indicate the center of the data eyes for the data bytes D0-D7. The deserialized data streams 530, 540 may then be sampled using the appropriate edges of the 4 GHz core clock 560, as described in detail above. As the sampling of the data streams 530, 540 continues, tracking the negative transitions of the 3 GHz source clock 550 results in the reconstructed data stream 570 corresponding to the first source data stream 530. Of course, a core clock domain data stream is generated for each of the deserialized source data streams 530, 540, as described above. Also, as before, the reconstructed data 570 is synchronized with the 4 GHz core clock 560, rather than the original source clock 510, and ready for processing in the core clock domain.

A limitation to the disclosed synchronization technique may occur as the deserialized source clock 550 approaches the frequency of the core clock 560. As this occurs, locating each of the negative transitions in the deserialized source clock 550 becomes increasingly difficult. As a result, the BER in the reconstructed data 570 may begin to increase. As the ratio approaches 1:1 between the core clock and the deserialized source clock (the embodiment in FIG. 5 has a 4:3 ratio, while the embodiment in FIG. 1 has a 4:2 ratio), an increase in BER may tend to occur. Thus, in an advantageous embodiment, a taller ratio, for example, when the core clock 560 is about two times the deserialized source clock 550, is employed. Moreover, by deserializing the source clock 510 into larger streams (e.g., 6 Gb/sec deserialized into two 3 Gb/sec data streams, rather than deserializing the 6 Gb/sec into three 2 Gb/sec streams or into six 1 Gb/sec streams), the original data stream 510 is broken up into thirds, rather than quarters or sixths, respectively. As a result, the deserialization is going from a ∀25% or ∀16.7%, respectively, to ∀33%, which may result in errors creeping into the reconstructed data. Furthermore, in some embodiments, the original serial source clock may already provide a desirable ratio, in which case sampling using the core clock signal may be done directly to the source clock without deserialization.

As may be understood from the disclosure set forth above, data transmitted from a source clock domain to a core clock domain may be sampled using the core clock signal to reconstruct the data originally synchronized with the local core clock signal by employing a simple state machine constructed as disclosed above. The disclosed synchronization circuit and technique employ the positive and negative transitions of the core clock to detect the negative transitions in the deserialized source clock, thus locating the optimum point (the center of the data eye) for sampling the transferred data stream. As a result, the reconstructed data is synchronized to the core clock, rather than the source clock, as though it originated in the core clock domain. Thus, the data may be processed by other components in the core clock domain, for example, for use in building instructions code or for issuing commands based on the data. Moreover, the synchronization technique according to the present invention, and the associated state machine circuitry, may be incorporated into almost any data transmission system in need of data synchronization, while still maintaining the benefits discussed above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of synchronizing a data stream, comprising:
receiving a plurality of deserialized data streams and a source clock signal synchronized with said plurality of deserialized data streams;
comparing positive and negative transitions of a core clock signal with negative transitions of said source clock signal to determine a timing relationship between the positive and negative transitions of the core clock signal and positions of the negative transitions of the source clock signal;
generating a final sampling signal based on the timing relationship;
sampling the plurality of deserialized data streams using the final sampling signal; and
generating a core data signal from the plurality of deserialized data streams that is synchronized with the core clock signal based on the sampling;
wherein the core clock frequency is independent of the source clock frequency.

2. The method as recited in claim 1, wherein the step of comparing further comprises comparing first the positive transitions of the core clock signal with the negative transitions of the source clock signal to generate a positive edge sampling signal, and comparing second the negative transitions of the core clock with the negative transitions of the source clock signal to generate a negative edge sampling signal, to determine the timing relationship between the transitions of the core clock signal and positions of the negative transitions of the source clock signal.

3. The method as recited in claim 2, wherein the first comparing step further comprises performing a comparison using a first flip-flop, and the second comparing step further comprises performing a comparison using a second flip-flop.

4. The method as recited in claim 2, wherein the step of generating the final sampling signal further comprises generating the final sampling signal based on the timing relationship between the transitions of the core clock signal and positions of the negative transitions of the source clock signal by combining the positive and negative sampling signals.

5. The method as recited in claim 4, wherein the step of combining further comprises combining the positive and negative sampling signals using a NAND gate followed by a NOT gate.

6. The method as recited in claim 1, wherein the step of sampling further comprises sampling the plurality of deserialized data streams using positive transitions of the final sampling signal.

7. The method as recited in claim 1, wherein the step of comparing further comprises comparing positive and negative transitions of the core clock signal having a frequency at least twice a frequency of the source clock signal.

8. The method as recited in claim 1, wherein the plurality of deserialized data streams are created from a source data signal, said plurality of deserialized data streams being received at a plurality of source data inputs, each of the plurality of deserialized data streams being received at one of the plurality of source data inputs.

9. The method as recited in claim 8, wherein a data byte from each of said plurality of deserialized data streams occupying a same time slot comprise consecutive data bytes from said source data signal.

10. The method as recited in claim 1, wherein said plurality of deserialized data streams are received via a respective plurality of interconnects that connect a first circuit operating at a source clock rate with a second circuit operating at a core clock rate.

11. A method of synchronizing a data stream, comprising:
   receiving a plurality of associated deserialized source data streams;
   receiving a deserialized source clock signal synchronized with said plurality of associated deserialized source data streams;
   comparing positive and negative transitions of a core clock signal with a predefined transition of the deserialized source clock signal, wherein said core clock signal is a higher frequency than the deserialized source clock signal;
   developing a timing relationship between the deserialized source clock signal and the core clock signal;
   determining a sampling edge for said plurality of associated deserialized source data streams based on said timing relationship;
   sampling each of said plurality of associated deserialized source data streams; and
   combining data from each of said plurality of associated deserialized source data streams to create a core data stream.

12. The method of synchronizing the data stream of claim 11, wherein the developing of the timing relationship further comprises:
   identifying an adjacent pair of the positive and negative transitions of the core clock signal that said predefined transition of the deserialized source clock signal falls between.

13. The method of synchronizing the data stream of claim 12, wherein said plurality of associated deserialized source data streams are received via a respective plurality of interconnects that connect a first circuit operating at a source clock rate with a second circuit operating at a core clock rate.

14. The method of synchronizing the data stream of claim 12, wherein the sampling edge is either the positive transition or the negative transition of said adjacent pair of the core clock signal; and
   wherein the predefined transition of the deserialized source clock signal is a negative transition.

15. The method of synchronizing the data stream of claim 13, wherein the predefined transition of the deserialized source clock signal is a negative transition.

16. The method of synchronizing the data stream of claim 13, wherein the plurality of associated deserialized source data streams are created by deserializing a single source data stream.

17. The method of synchronizing the data stream of claim 16, wherein the deserialized source clock signal is created from a source clock signal and is lower frequency than the source clock signal.

18. The method of synchronizing the data stream of claim 17, wherein the plurality of associated deserialized source data streams comprise at least three deserialized source data streams.

19. The method of synchronizing the data stream of claim 16, wherein a data byte from each of said plurality of associated deserialized source data streams occupying a same time slot comprise consecutive data bytes from the single source data stream.

* * * * *